Figure 4:
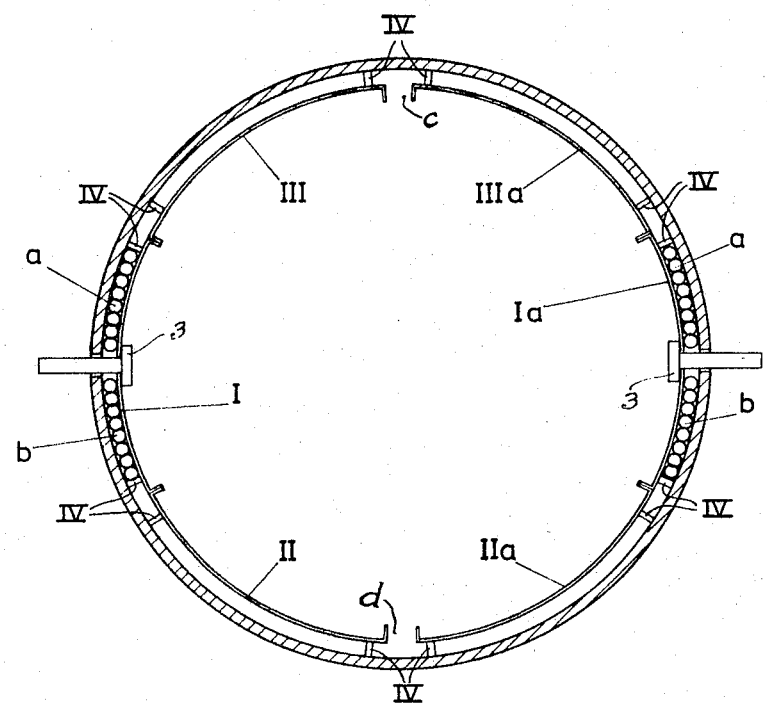

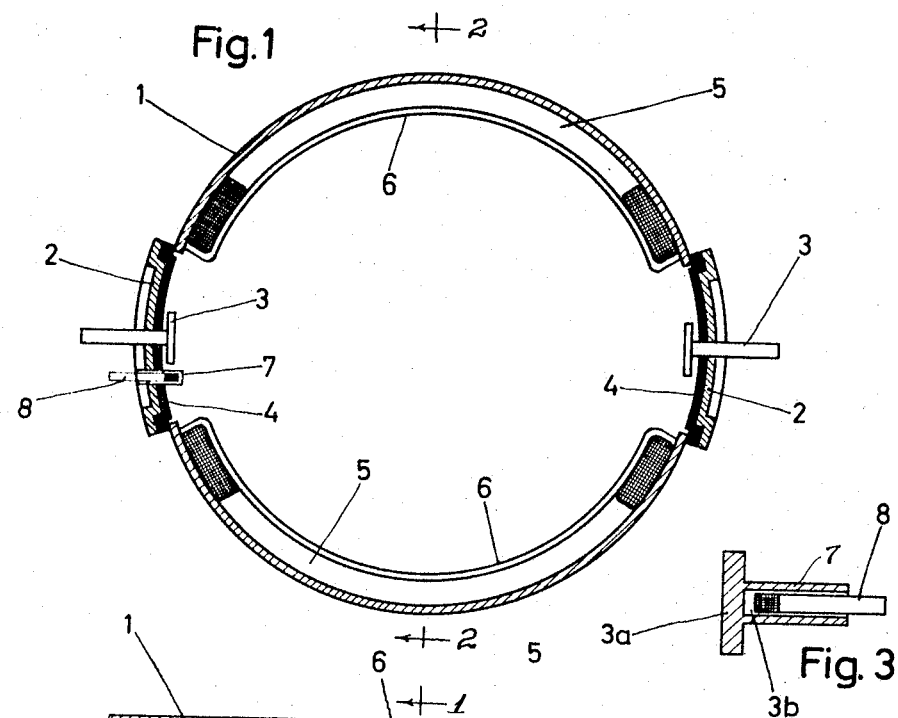
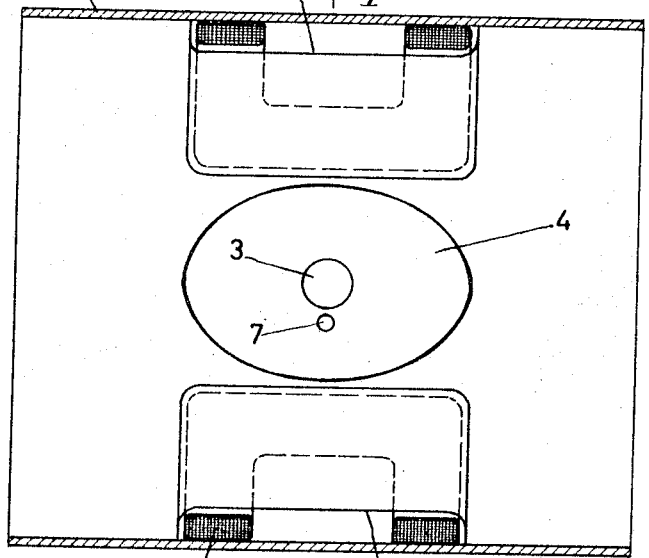

United States Patent Office 3,323,363
Patented June 6, 1967

3,323,363
INDUCTIVE FLOWMETER
Broder Ludwig Ketelsen, Gross-Ellershausen, Germany, assignors to Fischer & Porter G.m.b.H., Gross-Ellershausen, Germany, a German corporation
Filed Oct. 21, 1964, Ser. No. 405,623
3 Claims. (Cl. 73—194)

The present invention relates to inductive type magnetic flowmeters for measuring the flow rates of electrically conductive fluids, comprising diametrically opposed electrodes insulatedly mounted in a section of non-magnetic pipe and two operatively juxtaposed magnetic coils mounted within such pipe section.

In the known art to which such metering instruments pertain, a section of pipe has been lined, throughout, with an insulating material, which in time could become damaged by the solid particles entrained in the fluid flowing through the pipeline, particularly along the bottom of the pipe where such solid particles tend to accumulate by reason of gravity. Such damage of the aforementioned pipe liner can result in varying distortions of the electrical field; making for inaccuracy in measurement of the fluid velocity. Inasmuch as the damage to the liner is continually changing, the extent of the resultant changes or distortions of the electrical field are correspondingly varied, and hence it is not possible to compensate for such variations with any certainty.

In metering instruments of this type it therefore becomes necessary to remove the entire metering pipe section from the pipeline and then to reline such pipe section. This results in great disadvantage both in the installation as well as in the operation of the pipeline because the relining of the pipe section and its removal and reinstallation in the pipe line entails great cost.

The aforementioned inductive flow metering arrangement with the pipe section having an inner insulating liner throughout and with the magnetic coils interiorly mounted can result in distortion of the electrical field in the zone of the windings and hence also in the zone of the electrodes, with consequent errors in the metering results.

These disadvantages have rendered questionable and have unfavorably influenced the use of inductive magnetic flow-metering instruments with interiorly mounted magnetic coils, in pipelines of large cross-sectional areas. Notwithstanding the foregoing, it would be most desirable to use the arrangement of interorly mounted magnetic coils, especially in pipelines of the order of one meter (39″) or larger in diameter, because it is then possible to use for the metering pipe section the same material of which the rest of the pipeline is made, namely magnetic materials such as steel, cast iron and the like, and it is then not necessary to manufacture the metering pipe section from non-magnetic metal, such as nickel-chrome steel, as is required at least in the zone of the coils where the coils are mounted exteriorly on the pipe section.

The present invention succeeds in eliminating the aforementioned disadvantages by the following simple means. The aforementioned insulating pipe liner is omitted. The electrodes and operatively juxtaposed insulating covers in the measurement region are so arranged and mounted as to be protected against the effect of the fluid-entrained solid particles or foreign particles. The magnetic coils are placed adjacent to these insulating covers, preferably with their windings in close proximity of the electrodes. The two magnetic coils are located at the top and bottom of the pipe cross-section, and the electrodes are located on the sides of the pipe cross-section. The axis of the diametrically opposite magnetic coils and the axis of the diametrically opposite electrodes are at 90° to each other.

The aforementioned insulating covers (associated with the electrodes) are adjacent to the inner surface of the pipe section, and the size and shape of the said insulating covers (as shown in FIGURES 1 and 2) is such that the surrounding uninsulated surfaces of the metering pipe section will be symmetrical in relation to the electrode axis. As a result, damage to these insulating covers is prevented, so that the electrical field remains constant; whereby good metering results can be achieved.

Instead of rubber coating the coils, it is especially advantageous to provide non-magnetic metallic protective shields therefor. These metal shields are coated with an insulating material at least on their faces adjacent the fluid in the measurement region. However, for manufacturing reasons such metal shield may be so coated on both sides or faces thereof. These metallic shields are spaced from the inner wall of the pipe just sufficiently to accommodate the magnetic coils (between the pipe wall and the shield). The metal shields are electrically connected to the metering pipe section.

Here again (namely, in the case of these insulatedly coated coil shields) a part of the inner surface of the pipe section remains uninsulated, so that the lines of the electrical field which are farthest from the electrodes will be shorted out by such uninsulated pipe surfaces.

In larger diametered pipelines, a signal-voltage is produced in the generally homogeneous electrical field obtained from the generally symmetrical flow velocity profile. As the fact that the measurements (namely, the signal voltages dominantly impressed upon the electrodes) occur in the uniform velocity region of the flow profile, therefore it is possible to calibrate the instruments, in linear proportionality to the flow rate, by a single calibration at the installation site.

By the short circuiting of the electrical field lines farthest from the electrodes, it becomes practical to compensate for the weakening of the electrical field by increasing the excitation of the magnetic coils. To this end the excitation is trebled relative to the excitation required in arrangements in which the entire inner face of the pipe section has an insulating liner.

The upper and lower magnetic coils of which the lower one comes in contact with the fluid-entrained solid particles, are but little subject to damage because in practice the coils are formed of multi-conductor cables whose protective insulation and jacketing is normally sufficient protection against damage.

The details of the invention are disclosed more fully in the accompanying drawings, in which FIGURE 1 represents a cross-sectional view through the electrode-axis, taken on lines 1—1 of FIGURE 2, FIGURE 2 represents a cross-sectional view on line 2—2 of FIGURE 1, FIGURE 3 represents a cross-sectional view of a detail, and FIGURE 4 represents a cross-sectional view, through the electrode-axis, of another embodiment illustrative of the present invention.

The pipe section 1 can be connected to the adjacent portions of the pipeline by welding, for example.

The pipe section 1 is provided with diametrically opposite openings which are closed by the closure members 2, which are secured and sealed to the pipe section 1 in any conventional manner.

An electrode 3 extends through each closure member 2 and through its interiorly mounted insulating cover 4. Upper and lower magnetic coils 5 are mounted to the inner wall of the pipe section between the closure members 2. The major dimensions of the coils 5 are perpendicular or transverse to the pipe axis.

By reference to FIGURE 1, the magnetic coils 5 produce a field in the plane represented by the sheet of paper upon which FIGURE 1 appears and at a right angle to the pipe axis.

The particular shape of the magnetic coils 5, namely, having a substantially greater dimension in a direction transversely of the pipe axis than in the direction parallel to the pipe axis (as indicated in FIGURES 1 and 2) results in a saving in the installation length of the metering pipe section 1.

By means of the closure members 2, easy accessability to the magnetic coil 5 is provided without having to remove such coils. In the case of a failure of an electrode or damage to an insulating cover 4, the operativeness of the installation can be quickly restored by merely replacing the affected closure member 2.

The compensation coils 8 serve to compensate for the noise voltages produced by the transformer effects; the compensation of which is doubtful in larger pipe sizes without such compensation coils. The coils 8 are located in the zones of higher field strength. In the case, for example, of iron pipes of larger sizes with interiorly mounted magnet coils, the field outside the pipe is too weak to achieve compensation by means of the customary conductor loop, or such conductor loop must be considerably larger than normally used, and this is attended by difficulties.

Hollow or tubular members 7 are mounted through the closure members 2 for the purpose of receiving and housing the compensation coils 8. The inner ends of the hollow or tubular members 7 are closed or sealed. The compensation coils can be inserted from the outside. By this means, the compensation coils can be rotated and moved inwardly or outwardly, to vary the compensation effected thereby.

While in FIGURES 1 and 2 the compensation coil 8 is shown as being mounted in one of the closure members 2, it can as well be mounted in the other closure member 2. Under some circumstances it is advisable that the compensation coil not shown in FIGURES 1 and 2 be mounted on the other closure member 2 in mirror-image relation to the shown compensation coil, namely, above the electrode shown at the right-side of FIGURE 2.

In order to obviate the necessity of separately mounting the hollow or tubular coil receiving members 7 to the closure members 2 and in order also to obviate the necessity of forming additional holes through the closure members 2 and so as to maintain the strength of the closure members and the fluid-seal thereof, it is especially desirable to construct the electrodes 3 as illustrated in FIGURE 3, in the form of hollow electrodes, whereby the actual electrode end 3a is equipped with a hollow cylindrical coil receiving extension 3b, and such coil receiving extension of the electrode extends through the closure member 2 and is suitable for receiving the compensation coil 8 therewithin.

While the magnetic coils are normally protected against damage by their own insulation, in some cases it is desirable, particularly where the fluid-entrained particles have sharp edges, to cover the magnetic coils 5 with a shield 6 which is made out of a thin non-magnetic metal and is electrically connected to the pipe.

FIGURE 4 illustrates another embodiment of insulating cover. It is especially useful for large pipe sizes. The insulating covers are separately or individually changeable or replaceable, and consists of metal shields which are coated with an insulating material on the inwardly facing surfaces thereof for reasons of signal measurement. For manufacturing reasons the metal shields are preferably coated on both sides.

Each of the two metal shields is preferably made of a number of sections I, II and III, and Ia, IIa and IIIa, respectively, made of non-magnetic material. Each of the metal shields is fastened to the pipe section 1 by means of metallic spacers IV, which are disposed between the inner wall of the pipe section and the metal shields, so that both magnetic coils $a$ and $b$ are accommodated between the pipe-wall and the shields.

While the metal shields can be of optional forms, they are preferably formed from pieces of sheet-metal which have spaces or gaps $c$ and $d$ along their edges parallel to the pipe-axis, which permit a short circuiting of the outermost field lines.

Since, here, the metal shields are fastened to the metal pipe section at a distance therefrom, the fluid-entrained solid particles along the bottom of the pipe cannot cause any damage to the insulating cotaing facing the measurement region even where the shields reach to the bottom area of the pipe section.

Having described the invention, the following is claimed:

1. A magnetic flowmeter for inductively measuring the rate of flow electrically conductive fluids, including an electrically conductive ferromagnetic pipe section having an uninsulated inner surface, diametrically opposite access openings in said pipe section, readily replacable closure members in operative juxtaposition to said access openings, an electrode carried by each of said closure members in insulated relation to said pipe section and with its inner end disposed interiorly thereof and with its outer end disposed exteriorly thereof, an electrically insulating cover associated with each of said electrodes and carried by the corresponding closure member on the inner face thereof and facing the metering region, and diametrically opposite magnetic coils mounted interiorly of said pipe section intermediate said insulating covers.

2. A magnetic flowmeter for inductively measuring the rate of flow of electrically conductive fluids, including an electrically conductive ferromagnetic pipe section having an uninsulated inner surface, diametrically opposite access openings in said pipe section, readily replacable closure members in operative juxtaposition to said access openings, an electrode carried by each of said closure members in insulated relation to said pipe section and with its inner end disposed interiorly thereof and with its outer end disposed exteriorly thereof, an electrically insulating cover associated with each of said electrodes and carried by the corresponding closure member on the inner face thereof and facing the metering region, diametrically opposite magnetic coils mounted interiorly of said pipe section intermediate said insulating covers, a hollow member attached to at least one of said closure members and sealed in relation to the interior of the pipe section, with the interior of the hollow member accessible from the outside, and an adjustable compensation coil operatively mounted in said hollow member.

3. A magnetic flowmeter for inductively measuring the rate of flow of electrically conductive fluids, including an electrically conductive ferromagnetic pipe section having an uninsulated inner surface, diametrically opposite access openings in said pipe section, readily replacable closure members in operative juxtaposition to said access openings, an electrode carried by each of said closure members in insulated relation to said pipe section, and with its inner end disposed interiorly thereof and with its outer end disposed exteriorly thereof, an electrically insulating cover associated with each of said electrodes and carried by the corresponding closure member on the inner face thereof and facing the metering region, diametrically opposite magnetic coils mounted interiorly of said pipe section intermediate said insulating covers, a non-magnetic shield extending over each of said magnetic coils and arranged to shield them from the fluid, a hollow member attached to at least one of said closure members and sealed in relation to the interior of the pipe section, with the interior of the hollow member accessible from the outside, and an adjustable compensation coil operatively mounted in said hollow member.

References Cited

UNITED STATES PATENTS 3,108,474  10/1963  Sasaki et al. _____ 73—194
3,194,068  7/1965  Mannherz et al. _____ 73—194

RICHARD C. QUEISSER, *Primary Examiner.*

L. R. FRANKLIN, C. A. RUEHL, *Assistant Examiners.*